US011935453B2

(12) United States Patent
Park et al.

(10) Patent No.: US 11,935,453 B2
(45) Date of Patent: Mar. 19, 2024

(54) DISPLAY DEVICE HAVING A PLURLITY OF PIXEL ARRAYS CONNECTED TO DIFFERENT DATA LINES

(71) Applicant: SAMSUNG DISPLAY CO., LTD., Yongin-si (KR)

(72) Inventors: Sehyuk Park, Seongnam-si (KR); Jinyoung Roh, Hwaseong-si (KR); Woomi Bae, Daegu (KR); Hae-Kwan Seo, Hwaseong-si (KR); Youngha Sohn, Seongnam-si (KR); Jin-Wook Yang, Suwon-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 17/645,081

(22) Filed: Dec. 20, 2021

(65) Prior Publication Data

US 2022/0366828 A1 Nov. 17, 2022

(30) Foreign Application Priority Data

May 17, 2021 (KR) ........................ 10-2021-0063679

(51) Int. Cl.
*G09G 3/20* (2006.01)

(52) U.S. Cl.
CPC ... *G09G 3/2003* (2013.01); *G09G 2300/0452* (2013.01); *G09G 2310/027* (2013.01); *G09G 2310/0297* (2013.01); *G09G 2330/021* (2013.01)

(58) Field of Classification Search
CPC .................................................... G09G 3/2003
USPC ........................................................... 345/694
See application file for complete search history.

(56) References Cited

U.S. PATENT DOCUMENTS

| | | | | |
|---|---|---|---|---|
| 6,614,498 | B1 | 9/2003 | Tanaka et al. | |
| 10,733,935 | B2 | 8/2020 | Cha et al. | |
| 10,867,560 | B2 | 12/2020 | Yoon et al. | |
| 10,872,562 | B2 | 12/2020 | Na | |
| 2015/0213772 | A1* | 7/2015 | Tung | G09G 3/3659 345/694 |

(Continued)

FOREIGN PATENT DOCUMENTS

| | | |
|---|---|---|
| JP | 3636192 | 4/2005 |
| KR | 10-2019-0062679 | 6/2019 |

(Continued)

*Primary Examiner* — Long D Pham
(74) *Attorney, Agent, or Firm* — F. CHAU & ASSOCIATES, LLC

(57) ABSTRACT

A display device includes four pixel arrays, a data driver, and a demultiplexer. The data driver is electrically connected to first and second data output lines. The demultiplexer electrically connects first and second data lines to the first data output line and electrically connects third and fourth data lines to the second data output line. The first to fourth pixel arrays are adjacent to the first to fourth data lines, respectively. Each of the first to fourth pixel arrays includes first and second color pixels. The first color pixels in the second pixel array are connected to the second data line, the second color pixels in the second pixel array are connected to the third data line, the second color pixels in the third pixel array are connected to the third data line, and the first color pixels in the third pixel array are connected to the second data line.

20 Claims, 10 Drawing Sheets

(56) References Cited

U.S. PATENT DOCUMENTS

| | | | | |
|---|---|---|---|---|
| 2017/0221979 | A1* | 8/2017 | Chae | H01L 27/3272 |
| 2018/0151145 | A1* | 5/2018 | Lee | G09G 3/3614 |
| 2021/0233455 | A1 | 7/2021 | Yang et al. | |

FOREIGN PATENT DOCUMENTS

| | | |
|---|---|---|
| KR | 10-2019-0100550 | 8/2019 |
| KR | 10-2020-0014465 | 2/2020 |
| KR | 10-2020-0015870 | 2/2020 |

* cited by examiner

DISPLAY DEVICE HAVING A PLURLITY OF PIXEL ARRAYS CONNECTED TO DIFFERENT DATA LINES

CROSS-REFERENCE TO RELATED APPLICATIONS

This application claims priority under 35 U.S.C. § 119 to Korean Patent Application No. 10-2021-0063679, filed on May 17, 2021, in the Korean Intellectual Property Office, the disclosure of which is incorporated by reference herein in its entirety.

BACKGROUND

1. Field of the Disclosure

One or more embodiments described herein relate to a display device.

2. Description of the Related Art

A display device may include a driving circuit for driving a display panel to display an image. In some cases, the driving circuit includes a data driving circuit that outputs data driving signals to data lines, a scan driving circuit that outputs scan signals for driving scan lines, and a driving controller for controlling the data driving circuit and the scan driving circuit. Pixels of the display panel emit light to generate the image based on the scan signal and the data driving signals.

SUMMARY

One or more embodiments described herein provide a display device which, for example, may reduce power consumption and/or achieve other levels of performance.

In accordance with one or more embodiments, a display device includes first to fourth pixel arrays; a data driver electrically connected to a first data output line and a second data output line; and a demultiplexer configured to electrically connect a first data line and a second data line to the first data output line and to electrically connect a third data line and a fourth data line to the second data output line. The first to fourth pixel arrays are arranged adjacent to the first to fourth data lines respectively, each of the first to fourth pixel arrays includes first color pixels and second color pixels, the first color pixels in the second pixel array are connected to the second data line and the second color pixels in the second pixel array are connected to the third data line, and the second color pixels in the third pixel array are connected to the third data line and the first color pixels in the third pixel array are connected to the second data line.

In accordance with one or more embodiments, a display device includes a display panel including first color pixels and second color pixels; a data driver configured to electrically connect to a first data output line and a second data output line; and a demultiplexer configured to electrically connect a first data line and a second data line to the first data output line and to electrically connect a third data line and a fourth data line to the second data output line. The first color pixels are connected to a corresponding data line among the first data line and the second data line, the second color pixels are connected to a corresponding data line among the third data line and the fourth data lines, and the data driver is configured to output a data signal of a first color, which is to be provided to the first color pixels, to the first data output line and to output a data signal of a second color, which is to be provided to the second color pixels, to the second data output line.

BRIEF DESCRIPTION OF THE FIGURES

The above and other features of the present disclosure are apparent by describing in detail embodiments with reference to the accompanying drawings.

DETAILED DESCRIPTION

Figure 1:
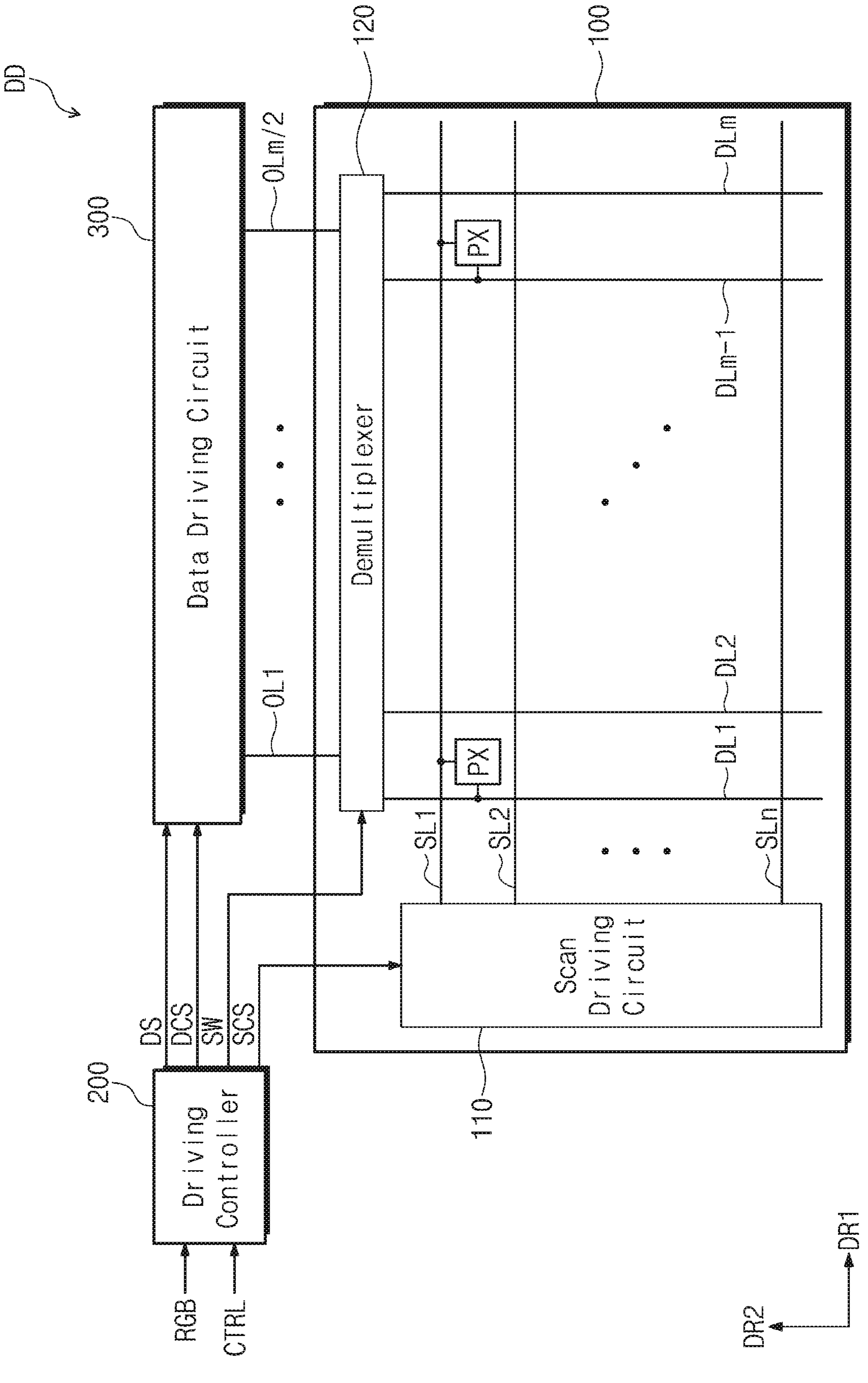
FIG. 1 illustrates an embodiment of a display device.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the meaning as commonly understood by those skilled in the art to which the present disclosure belongs. Furthermore, terms such as terms defined in commonly used dictionaries should be interpreted as having a meaning consistent with the meaning in the context of the related technology, and should not be interpreted in an overly ideal or overly formal sense unless explicitly defined herein.

Hereinafter, embodiments of the present disclosure will be described with reference to accompanying drawings.

FIG. 1 is a block diagram of a display device DD, according to an embodiment of the present disclosure.

Referring to FIG. 1, the display device DD includes a display panel 100, a driving controller 200, and a data driving circuit 300. The display panel 100 includes a scan driving circuit 110, a demultiplexer 120, a plurality of pixels PX, a plurality of data lines DL1 to DLm, and a plurality of scan lines SL1 to SLn. Each of the pixels PX is connected to a corresponding data line among the data lines DL1 to DLm and to a corresponding scan line among the scan lines SL1 to SLn.

Each of the scan lines SL1 to SLn extends in a first direction DR1 and is arranged spaced from each other in a second direction DR2. Each of the data lines DL1 to DLm extends in the second direction DR2 and is arranged spaced from each other in the first direction DR1.

The display panel 100 may be a panel that displays an image and, for example, may be a liquid crystal display (LCD) panel, an electrophoretic display panel, an organic light emitting diode (OLED) panel, a light emitting diode (LED) panel, an inorganic electro luminescent (EL) display panel, a field emission display (FED) panel, a surface-conduction electron-emitter display (SED) panel, a plasma display panel (PDP), or a cathode ray tube (CRT) display panel.

The driving controller 200 receives an image signal RGB from a host or other source (e.g., an external source) and a control signal CTRL for controlling the display of the image signal RGB. For example, the control signal CTRL may include at least one synchronization signal and at least one clock signal. The driving controller 200 provides the data driving circuit 300 with an image data signal DS that is obtained by processing the image signal RGB depending on operating conditions of the display panel 100. On the basis of the control signal CTRL, the driving controller 200 provides a first control signal DCS to the data driving circuit 300, a second control signal SCS to the scan driving circuit 110, and a third control signal SW to the demultiplexer 120. The first control signal DCS may include a horizontal synchronization start signal, a clock signal, and a line latch signal. The second control signal SCS may include a vertical synchronization start signal and an output enable signal. The third control signal SW may include switching signals for switching switching transistors in the demultiplexer 120.

The data driving circuit 300 may output data signals for driving a plurality of data output lines OL1 to OLm/2 in response to the first control signal DCS and the image data signal DS from the driving controller 200. In an embodiment, the data driving circuit 300 may be implemented as an integrated circuit (IC). The data driving circuit 300 may be directly mounted in a predetermined area of the display panel 100 or may be mounted on a separate printed circuit board in a chip on film (COF) scheme, and then may be electrically connected to the display panel 100. In an embodiment, the data driving circuit 300 may be formed in or using substantially the same process as the pixels PX on the display panel 100.

The scan driving circuit 110 drives the plurality of scan lines SL1 to SLn in response to the second control signal SCS from the driving controller 200. In an embodiment, the scan driving circuit 110 may be formed in the same (or substantially the same) process as the pixels PX on the display panel 100, but is not limited thereto. For example, the scan driving circuit 110 may be implemented as an IC. The scan driving circuit 110 may be directly mounted in a predetermined area of the display panel 100 or on a separate printed circuit board, for example, in a COF scheme, and then may be electrically connected to the display panel 100. In an embodiment, the scan driving circuit 110 may sequentially drive the scan lines SL1 to SLn at the active level.

The demultiplexer 120 may electrically connect the plurality of data output lines OL1 to OLm/2 and the data lines DL1 to DLm in response to the third control signal SW provided from the driving controller 200. In an embodiment, the demultiplexer 120 may electrically connect the plurality of data output lines OL1 to OLm/2 to odd-numbered data lines (DL1, DL3, . . . , DLm−1) among the data lines DL1 to DLm in response to the third control signal SW. In an embodiment, the demultiplexer 120 may electrically connect the plurality of data output lines OL1 to OLm/2 to even-numbered data lines (DL2, DL4, . . . , DLm) among the data lines DL1 to DLm in response to the third control signal SW.

In the following description, it is described that each of the plurality of data output lines OL1 to OLm/2 corresponds to two data lines among the data lines DL1 to DLm, but the present disclosure is not limited thereto. For example, each of the plurality of data output lines OL1 to OLm/2 may correspond to three or more data lines among the data lines DL1 to DLm. For example, the demultiplexer 120 may electrically connect each of the data output lines OL1 to OLm/2 to three or more data lines.

FIG. 1 illustrates that the demultiplexer 120 is disposed on the display panel 100, but the present disclosure is not limited thereto. In an embodiment, the demultiplexer 120 may be included in the data driving circuit 300. In an embodiment, the demultiplexer 120 may be provided in a separate driving circuit or circuit board independent of each of the display panel 100 and the data driving circuit 300.

Figure 2:
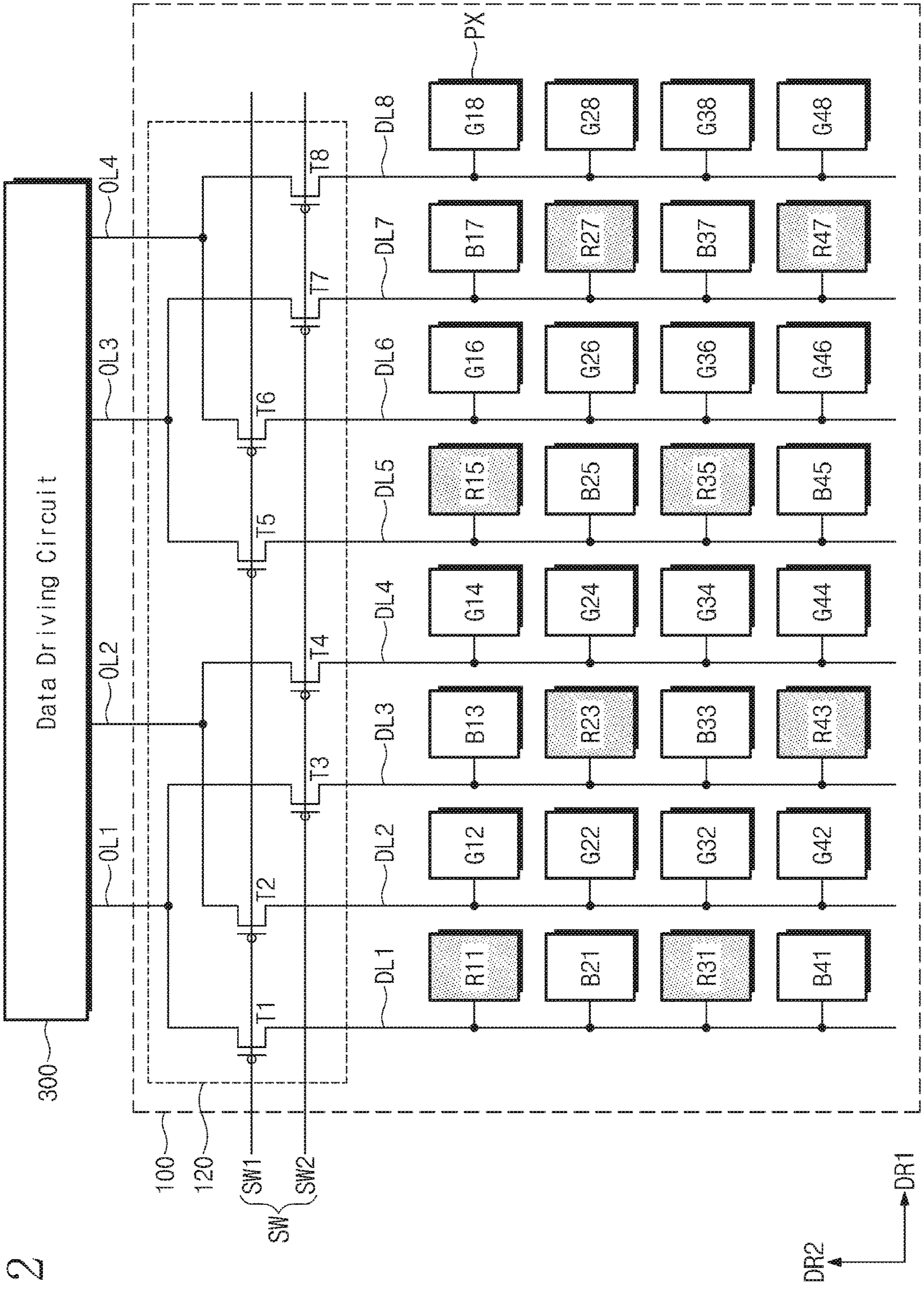
FIG. 2 illustrates an embodiment of pixels and a demultiplexer of a display panel.

FIG. 2 is a diagram illustrating pixels PX and the demultiplexer 120 of display panel 100 according to an embodiment.

Referring to FIG. 2, the display panel 100 includes the pixels PX, the demultiplexer 120 and the data lines DL1 to DL8. Only the four data output lines OL1 to OL4 and the eight data lines DL1 to DL8 are illustrated in FIG. 2, but the present disclosure is not limited thereto. The demultiplexer 120 may electrically connect the data output lines OL1 to OL4 of the data driving circuit 300 to the data lines DL1 to DL8.

In this embodiment, the demultiplexer 120 includes switching transistors T1 to T8. Each of the switching transistors T1 to T8 is connected between a corresponding data output line of the data output lines OL1 to OL4 and a corresponding data line of the data lines DL1 to DL8. For example, the switching transistor T1 is connected between the data output line OL1 and the data line DL1. The switching transistor T2 is connected between the data output line OL2 and the data line DL2. The switching transistor T3 is connected between the data output line OL1 and the data line DL3. The switching transistor T4 is connected between the data output line OL2 and the data line DL4. The switching transistor T5 is connected between the data output line OL3 and the data line DL5. The switching transistor T6 is connected between the data output line OL4 and the data line DL6. The switching transistor T7 is connected between the data output line OL3 and the data line DL7. The switching transistor T8 is connected between the data output line OL4 and the data line DL8.

Each of the gate electrodes of the switching transistors T1, T2, T5, and T6 receives a first switching signal SW1. Each of the gate electrodes of the switching transistors T3, T4, T7, and T8 receives a second switching signal SW2. The switching transistors T1, T2, T5, and T6 may be turned on/off in response to the first switching signal SW1, and the switching transistors T3, T4, T7, and T8 may be turned on/off in response to the second switching signal SW2. In one embodiment, the first switching signal SW1 and the second switching signal SW2 may be included in the third control signal SW provided from the driving controller 200 illustrated in FIG. 1.

In the example shown in FIG. 2, the switching transistors T1 to T8 are PMOS transistors, but the present disclosure is not limited thereto. For example, the switching transistors T1 to T8 may be NMOS transistors. In an embodiment, some of the switching transistors T1 to T8 may be PMOS transistors and others may be NMOS transistors.

The pixels PX include first color pixels (R11, R15, R23, R27, R31, R35, R43, R47), second color pixels (B13, B17, B21, B25, B33, B37, B41, B45), and third color pixels (G12, G14, G16, G18, G22, G24, G26, G28, G32, G34, G36, G38, G42, G44, G46, G48). In the following description, "R" is written in first color pixels; "B" is written in second color pixels; and, "G" is written in third color pixels.

In an embodiment, the first color pixels (R) may emit red color light. The second color pixels (B) may emit blue color light. The third color pixels (G) may emit green color light. However, the present disclosure is not limited thereto, and the first color pixels (R), the second color pixels (B), and the third color pixels (G) may emit a different combination of light, e.g., yellow, cyan, and magenta.

The pixels PX may be connected to corresponding data lines among the data lines DL1 to DL8. The pixels PX arranged in the same row in the first direction DR1 may be connected to the same scan line. For example, the color pixels (R11, G12, B13, G14, R15, G16, B17, G18) in the first row are connected to the scan line SL1 shown in FIG. 1. The color pixels (B21, G22, R23, G24, B25, G26, R27, G28) in the second row are connected to the scan line SL2 shown in FIG. 1.

The first color pixels (R) and the second color pixels (B) are connected to each of the data lines (DL1, DL3, DL5, DL7). One of the first color pixels (R) and one of the second color pixels (B) may be alternately connected to respective ones of the data lines (DL1, DL3, DL5, DL7). For example, a first color pixel (R) and a second color pixel (B) are connected to the data line DL1 in a first pattern (or sequence). A second color pixel (B) and a first color pixel (R) are connected to the data line DL3 in an alternate pattern (or sequence). The third color pixels (G) may be connected to data lines (DL2, DL4, DL6, DL8).

When the first switching signal SW1 is at an active level (e.g., a turn-on or low logical level) and the second switching signal SW2 is at an inactive level (e.g., a turn-off or high logical level), the switching transistors (T1, T2, T5, T6) are turned on and the switching transistors (T3, T4, T7, T8) are turned off. Accordingly, the data output lines OL1 to OL4 of the data driving circuit 300 may be electrically connected to the data lines (DL1, DL2, DL5, DL6) through the switching transistors (T1, T2, T5, T6), respectively.

When the first switching signal SW1 is at an inactive level (e.g., high level) and the second switching signal SW2 is at an active level (e.g., a low level), the switching transistors (T1, T2, T5, T6) are turned off and the switching transistors (T3, T4, T7, T8) are turned on. Accordingly, the data output lines OL1 to OL4 of the data driving circuit 300 may be electrically connected to the data lines (DL3, DL4, DL7, DL8) through the switching transistors (T3, T4, T7, T8), respectively.

Figure 3A:
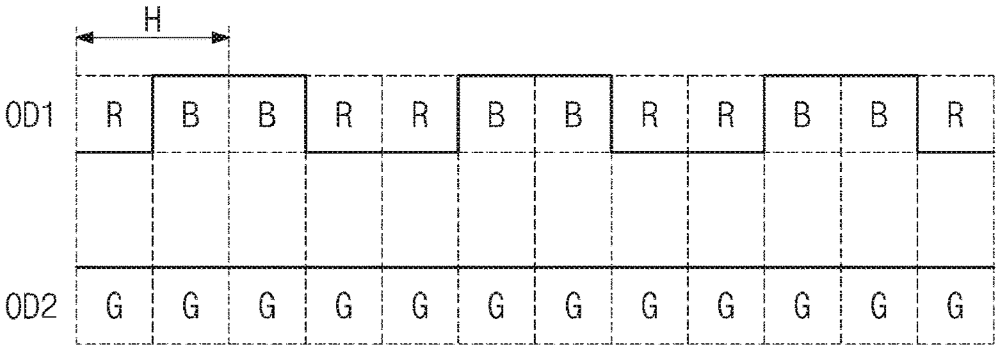
FIGS. 3A to 3C illustrate embodiments of data signals output from a data driving circuit.
Figure 3B:
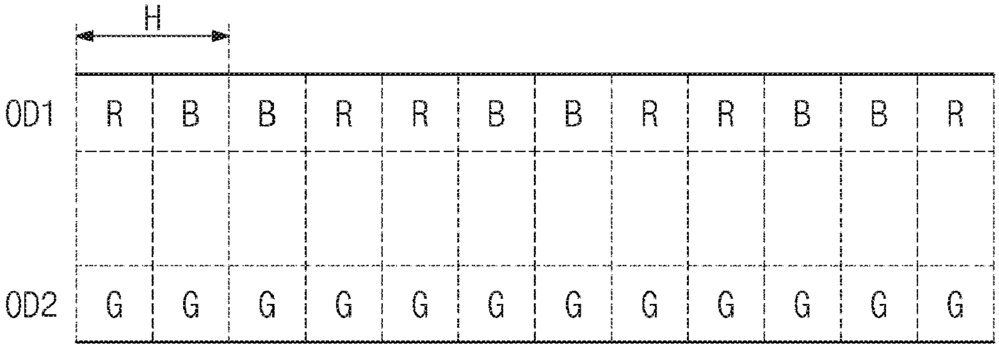
Figure 3C:
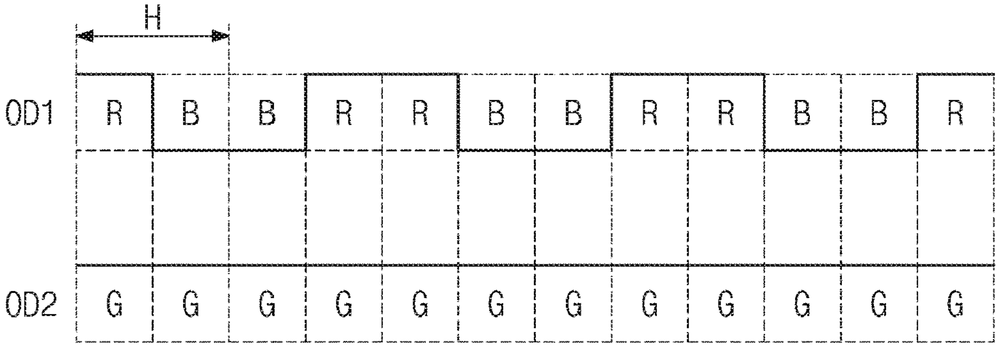

FIGS. 3A to 3C are diagrams illustrating one method in which data signals may be output from a data driving circuit, such as shown in FIG. 2.

FIG. 3A illustrates data signals OD1 and OD2 output by the data driving circuit 300 to the data output lines OL1 and OL2 when a red pattern image is displayed on the display panel 100.

Referring to FIGS. 2 and 3A, when the red pattern image is displayed on the display panel 100, data signals to be provided to the first color pixels (R) correspond to a maximum grayscale level, and data signals to be provided to the second color pixels (B) and the third color pixels (G) may correspond to a minimum grayscale level.

The data driving circuit 300 sequentially outputs data signals to be provided to the first color pixel R11 and the second color pixel B13 to the data output line OL1 during 1 horizontal period (H). In one embodiment, 1 horizontal period (H) may refer to a time in which the pixels (PX) arranged in a common row in the first direction DR1 are driven.

The first switching signal SW1 and the second switching signal SW2 are complementary signals, which may transition to an active level and an inactive level at each ½ horizontal period (H). In an embodiment, while the first switching signal SW1 is at an active level (a low level), the switching transistor T1 is turned on. Thus, the data signal OD1 output from the data output line OL1 of the data driving circuit 300 may be delivered to the first color pixel R11 through the data line DL1. Subsequently, when the second switching signal SW2 is at an active level (a low level), the switching transistor T3 is turned on. Thus, the data signal OD1 output from the data output line OL1 of the data driving circuit 300 may be delivered to the second color pixel B13 through the data line DL3.

In one embodiment, the data output line OL1 of the data driving circuit 300 is connected to the first color pixels (R) and the second color pixels (B) through the data lines DL1 and DL3. Thus the data driving circuit 300 may alternately output a data signal for the first color pixels (R) and a data signal for the second color pixels (B) to the data output line Oil.

As shown in FIG. 3A, when the red pattern image is displayed on the display panel 100, the data driving circuit 300 may alternately output a data signal corresponding to the maximum grayscale level and a data signal corresponding to the minimum grayscale level to the data output line OL1 at each 1 horizontal period (H). Thus, power consumption of the display device DD may increase.

FIG. 3B illustrates the data signals OD1 and OD2 output by the data driving circuit 300 to the data output lines OL1 and OL2 when a green pattern image is displayed on the display panel 100. Referring to FIGS. 2 and 3B, when the green pattern image is displayed on the display panel 100, data signals to be provided to the first color pixels (R) and the second color pixels (B) may correspond to a minimum grayscale level, and data signals to be provided to the third color pixels (G) may correspond to a maximum grayscale level.

FIG. 3C illustrates the data signals OD1 and OD2 output by the data driving circuit 300 to the data output lines OL1 and OL2 when a blue pattern image is displayed on the display panel 100. Referring to FIGS. 2 and 3C, when the blue pattern image is displayed on the display panel 100, data signals to be provided to the first color pixels (R) and the third color pixels (G) may correspond to a minimum grayscale level, and data signals to be provided to the second color pixels (B) may correspond to a maximum grayscale level. As shown in FIG. 3C, when the blue pattern image is displayed on the display panel 100, the data driving circuit 300 may alternately output a data signal corresponding to the minimum grayscale level and a data signal corresponding to the maximum grayscale level to the data output line OL1 at each 1 horizontal period (H). Thus, power consumption of the display device DD may increase.

Figure 4:
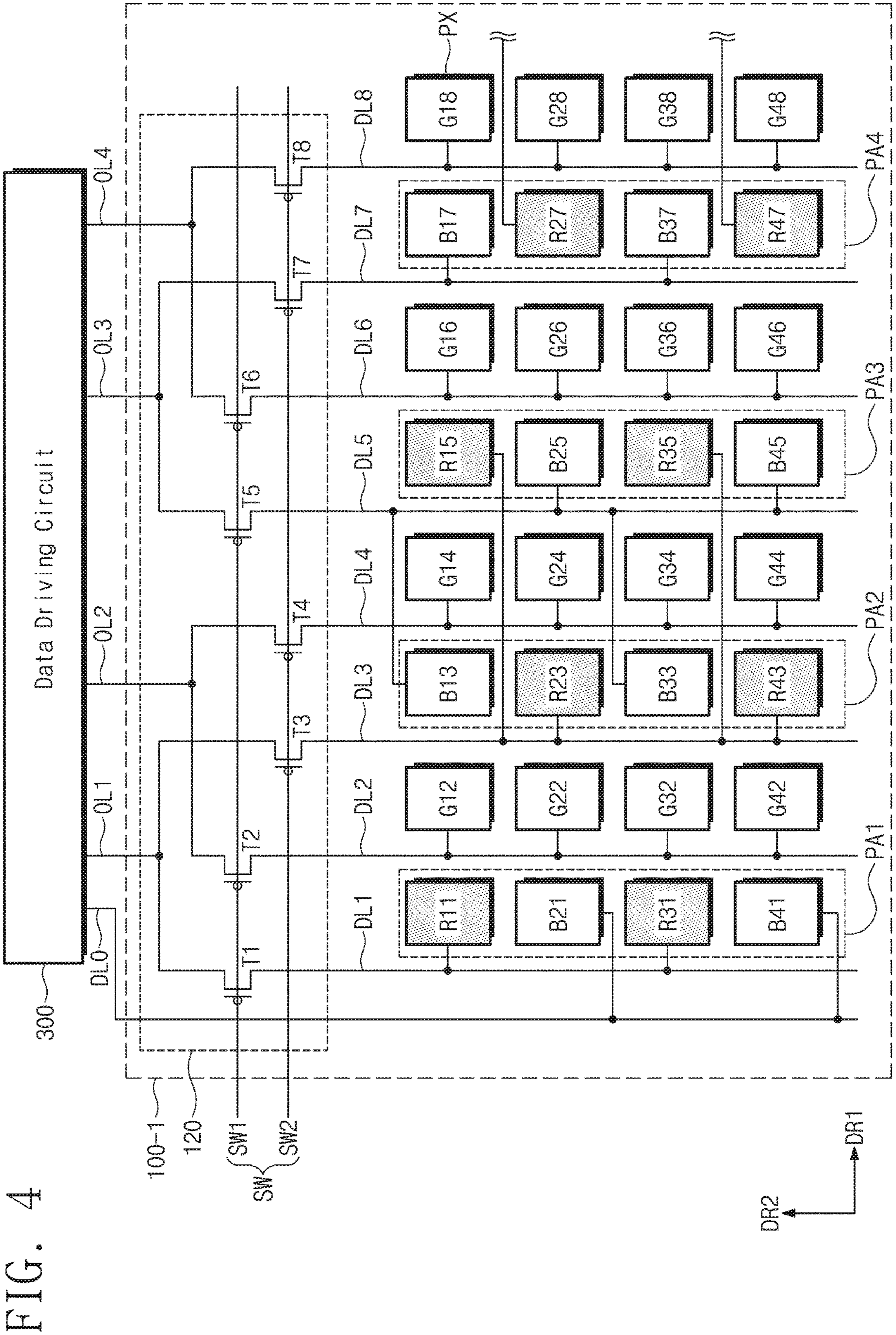
FIG. 4 illustrates an embodiment of pixels and a demultiplexer of a display panel.

FIG. 4 is a diagram illustrating pixels and a demultiplexer of a display panel 100-1 according to an embodiment.

Referring to FIG. 4, the display panel 100-1 includes first to fourth pixel arrays PA1, PA2, PA3, and PA4, the third color pixels (G), the demultiplexer 120, and the data lines DL0 to DL8. Only the nine data lines DL0 to DL8 are illustrated in FIG. 4, but the present disclosure is not limited thereto.

The demultiplexer 120 may electrically connect the data output lines OL1 to OL4 of the data driving circuit 300 to the data lines DL1 to DL8. For example, the demultiplexer 120 may electrically connect the data output line OL1 to the data lines DL1 and DL3, the data output line OL2 to the data lines DL2 and DL4, the data output line OL3 to the data lines DL5 and DL7, and the data output line OL4 to the data lines DL6 and DL8. The demultiplexer 120 includes the switching transistors T1 to T8. The demultiplexer 120 may have the same (or substantially the same) circuit configuration as the demultiplexer 120 shown in FIG. 2, and thus an additional description will be omitted to avoid redundancy.

The first to fourth pixel arrays PA1, PA2, PA3, and PA4 are arranged adjacent to the data lines DL1, DL3, DL5, and DL7, respectively. Each of the first to fourth pixel arrays PA1, PA2, PA3, and PA4 may include the first color pixels (R) and the second color pixels (B). Each of the first pixel array PA1 and the third pixel array PA3 includes the first color pixels (R) and the second color pixels (B) alternately arranged one-by-one in a direction opposite to the second direction DR2. Each of the second pixel array PA2 and the fourth pixel array PA4 includes the second color pixels (B) and the first color pixels (R) alternately arranged one-by-one in a direction opposite to the second direction DR2.

In the example shown in FIG. 4, the first color pixels (R) include the first color pixels (R11, R15, R23, R27, R31, R35, R43, R47). The second color pixels (B) include second color pixels (B13, B17, B21, B25, B33, B37, B41, B45). The third color pixels (G) include third color pixels (G12, G14, G16, G18, G22, G24, G26, G28, G32, G34, G36, G38, G42, G44, G46, G48).

In an embodiment, the first color pixels (R) may be red color pixels, the second color pixels (B) may be blue color pixels, and the third color pixels (G) may be green color pixels. However, the present disclosure is not limited thereto. For example, the first color pixels (R), the second color pixels (B), and the third color pixels (G) may include various color pixels such as yellow, cyan, and magenta.

The pixels PX may be connected to corresponding data lines among the data lines DL1 to DL8. The pixels PX arranged in the same row in the first direction DR1 may be connected to the same scan line. For example, the color pixels (R11, G12, B13, G14, R15, G16, B17, G18) in the first row are connected to the scan line SL1 shown in FIG. 1. The color pixels (B21, G22, R23, G24, B25, G26, R27, G28) in the second row are connected to the scan line SL2 shown in FIG. 1.

The first color pixels R11 and R31 in the first pixel array PA1 are connected to the data line DL1. The second color pixels B21 and B41 in the first pixel array PA1 are connected to the data line DL0.

The first color pixels R23 and R43 in the second pixel array PA2 are connected to the data line DL3. The second color pixels B13 and B33 in the second pixel array PA2 are connected to the data line DL5.

The first color pixels R15 and R35 in the third pixel array PA3 are connected to the data line DL3. The second color pixels B25 and B45 in the third pixel array PA3 are connected to the data line DL5.

The first color pixels R27 and R47 in the fourth pixel array PA4 may be connected to a data line arranged on the right side of the data line DL8. The second color pixels B17 and B37 in the fourth pixel array PA4 are connected to the data line DL7.

The third color pixels G12, G22, G32, and G42 are connected to the data line DL2, the third color pixels G14, G24, G34, and G44 are connected to the data line DL4, the third color pixels G16, G26, G36, and G46 are connected to the data line DL6, and the third color pixels G18, G28, G38, and G48 are connected to the data line DL8.

Thus, only the first color pixels (R) are connected to the data lines DL1 and DL3, only the second color pixels (B) are connected to data lines DL5 and DL7, and only the third color pixels (G) are connected to data lines DL2, DL4, DL6, and DL8.

Figure 5A:
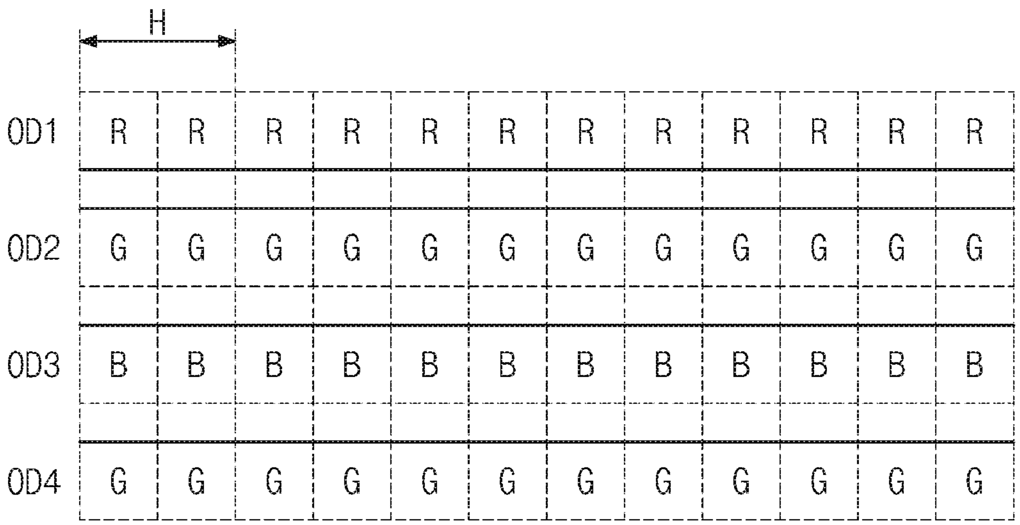
FIGS. 5A to 5C illustrate an embodiment of data signals output from a data driving circuit.
Figure 5B:
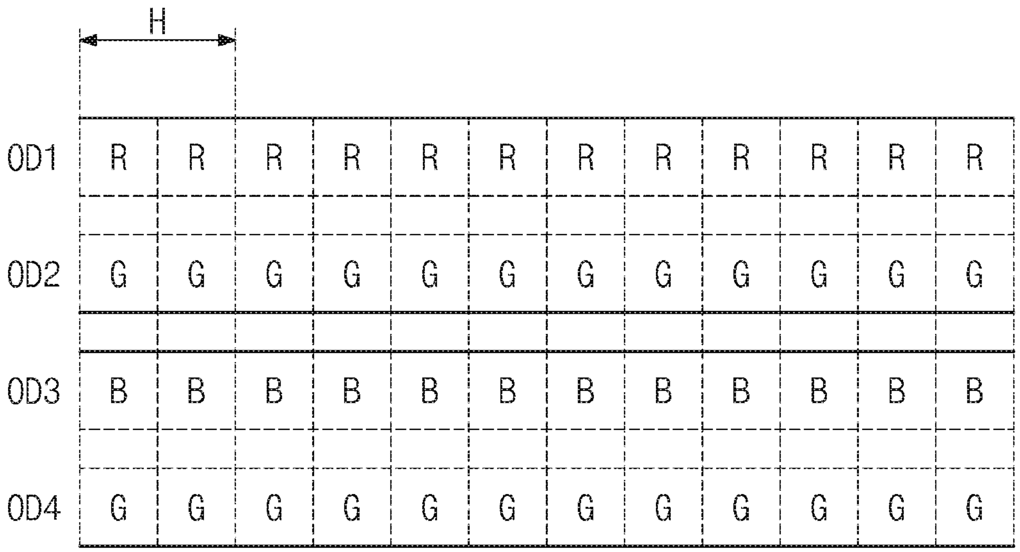
Figure 5C:
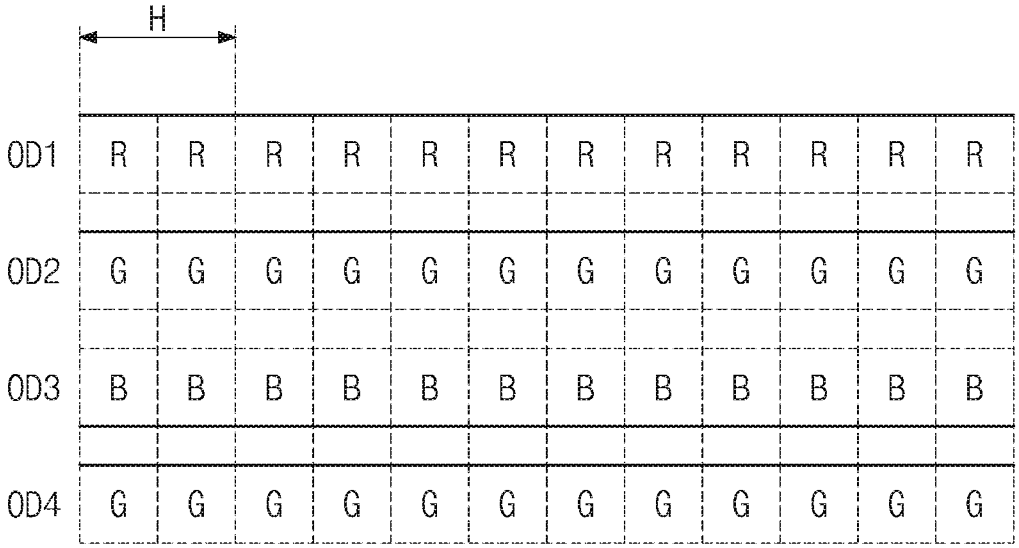

FIGS. 5A to 5C are diagrams illustrating data signals output from a data driving circuit shown in FIG. 4 according to an embodiment.

FIG. 5A illustrates data signals OD1, OD2, OD3, and OD4 output by the data driving circuit 300 to the data output lines OL1, OL2, OL3, and OL4 when a red pattern image is displayed on the display panel 100-1. Referring to FIGS. 4 and 5A, when the red pattern image is displayed on the display panel 100-1, data signals to be provided to the first color pixels (R) correspond to a maximum grayscale level, and data signals to be provided to the second color pixels (B) and the third color pixels (G) may correspond to a minimum grayscale level.

The data driving circuit 300 sequentially outputs data signals to be provided to the first color pixel R11 and the first color pixel R15 to the data output line OL1, during 1 horizontal period (H). In one embodiment, 1 horizontal period (H) may refer to a time in which the pixels (PX) arranged in a common row in the first direction DR1 are driven.

The data driving circuit 300 sequentially outputs data signals to be provided to the third color pixel G12 and the third color pixel G14 to the data output line OL2, during 1 horizontal period (H).

The data driving circuit 300 sequentially outputs data signals to be provided to the second color pixel B13 and the second color pixel B17 to the data output line OL3, during 1 horizontal period (H).

The data driving circuit 300 sequentially outputs data signals to be provided to the third color pixel G16 and the third color pixel G18 to the data output line OL4, during 1 horizontal period (H).

The first switching signal SW1 and the second switching signal SW2 are complementary signals, and may transition to an active level and an inactive level at each ½ horizontal period (H). In an embodiment, while the first switching signal SW1 is at an active level (a low level), the switching transistors T1, T2, T5, and T6 are turned on. Thus, the data signals OD1, OD2, OD3, and OD4 output from data output lines OL1, OL2, OL3, and OL4 of the data driving circuit 300 may be transmitted to data lines DL1, DL2, DL5, and DL6, respectively. For example, the data signals OD1, OD2, OD3, and OD4 output from the data output lines OL1, OL2, OL3, and OL4 of the data driving circuit 300 may be provided to the first color pixel (R11), the third color pixel (G12), the second color pixel (B13), and the third color pixel (G16).

Subsequently, when the second switching signal SW2 is at an active level (a low level), the switching transistors T3, T4, T7, and T8 are turned on. Thus, the data signals OD1, OD2, OD3, and OD4 output from data output lines OL1, OL2, OL3, and OL4 of the data driving circuit 300 may be transmitted to data lines DL3, DL4, DL7, and DL8, respectively. For example, the data signals OD1, OD2, OD3, and OD4 output from the data output lines OL1, OL2, OL3, and OL4 of the data driving circuit 300 may be provided to the first color pixel (R15), the third color pixel (G14), the second color pixel (B17), and the third color pixel (G18).

As shown in FIG. 5A, when the red pattern image is displayed on the display panel 100-1, the data driving circuit 300 may output the data signal OD1 corresponding to a maximum grayscale level of a red color to the data output line OL1. The data signal OD1 output from the data driving circuit 300 to the data output line OL1 may be sequentially provided to the first color pixels R11, R15, R23, R31, R35, and R43.

When the red pattern image is displayed on the display panel 100-1, the data driving circuit 300 may output the data signal OD2 corresponding to a minimum grayscale level of a green color to the data output line OL2. The data signal OD2 output from the data driving circuit 300 to the data output line OL2 may be sequentially provided to the third color pixels G12, G14, G22, G24, G32, G34, G42, and G44.

When the red pattern image is displayed on the display panel 100-1, the data driving circuit 300 may output the data signal OD3 corresponding to a minimum grayscale level of a blue color to the data output line OL3. The data signal OD3 output from the data driving circuit 300 to the data output line OL3 may be sequentially provided to the second color pixels B13, B17, B25, B33, B37, and B45.

When the red pattern image is displayed on the display panel 100-1, the data driving circuit 300 may output the data signal OD4 corresponding to a minimum grayscale level of a green color to the data output line OL4. The data signal OD4 output from the data driving circuit 300 to the data output line OL4 may be sequentially provided to the third color pixels G16, G18, G26, G28, G36, G38, G46, and G48.

As shown in FIG. 5A, when the red pattern image is displayed on the display panel 100-1, the data driving circuit 300 may continuously output a data signal corresponding to the maximum grayscale level of a red color to the data output line OL1, may continuously output data signals corresponding to the minimum grayscale level of a green color to data output lines OL2 and OL4, and may continuously output a data signal corresponding to the minimum grayscale level of a blue color to the data output line OL3. Accordingly, when the red pattern image is displayed on the display panel 100-1, the data signals output to data output lines OL1, OL2, OL3, and OL4 may be maintained at a substantially constant voltage level. As a result, power consumption of the display device DD may be reduced or minimized.

FIG. 5B illustrates data signals OD1, OD2, OD3, and OD4 output by the data driving circuit 300 to the data output lines OL1, OL2, OL3, and OL4 when a green pattern image is displayed on the display panel 100. Referring to FIGS. 4 and 5B, when the green pattern image is displayed on the display panel 100-1, data signals to be provided to the first color pixels (R) and the second color pixels (B) may correspond to a minimum grayscale level, and data signals to be provided to the third color pixels (G) may correspond to a maximum grayscale level.

As shown in FIG. 5B, when the green pattern image is displayed on the display panel 100-1, the data driving circuit 300 may output the data signal OD1 corresponding to a minimum grayscale level of a red color to the data output line OL1. The data signal OD1 output from the data driving circuit 300 to the data output line OL1 may be sequentially provided to the first color pixels R11, R15, R23, R31, R35, and R43.

When the green pattern image is displayed on the display panel 100-1, the data driving circuit 300 may output the data signal OD2 corresponding to the maximum grayscale level of a green color to the data output line OL2. The data signal OD2 output from the data driving circuit 300 to the data output line OL2 may be sequentially provided to the third color pixels G12, G14, G22, G24, G32, G34, G42, and G44.

When the green pattern image is displayed on the display panel 100-1, the data driving circuit 300 may output the data signal OD3 corresponding to a minimum grayscale level of a blue color to the data output line OL3. The data signal OD3 output from the data driving circuit 300 to the data output line OL3 may be sequentially provided to the second color pixels B13, B17, B25, B33, B37, and B45.

When the green pattern image is displayed on the display panel 100-1, the data driving circuit 300 may output the data signal OD4 corresponding to the maximum grayscale level of a green color to the data output line OL4. The data signal OD4 output from the data driving circuit 300 to the data output line OL4 may be sequentially provided to the third color pixels G16, G18, G26, G28, G36, G38, G46, and G48.

FIG. 5C illustrates data signals OD1, OD2, OD3, and OD4 output by the data driving circuit 300 to the data output lines OL1, OL2, OL3, and OL4 when a blue pattern image is displayed on the display panel 100-1. Referring to FIGS. 4 and 5C, when the blue pattern image is displayed on the display panel 100-1, data signals to be provided to the first color pixels (R) and the third color pixels (G) may correspond to a minimum grayscale level, and data signals to be provided to the second color pixels (B) may correspond to a maximum grayscale level.

As shown in FIG. 5C, when the blue pattern image is displayed on the display panel 100-1, the data driving circuit 300 may output only the data signal OD1 corresponding to a minimum grayscale level of a red color to the data output line OL1. The data signal OD1 output from the data driving circuit 300 to the data output line OL1 may be sequentially provided to the first color pixels R11, R15, R23, R31, R35, and R43.

When the blue pattern image is displayed on the display panel 100-1, the data driving circuit 300 may output the data signal OD2 corresponding to a minimum grayscale level of a green color to the data output line OL2. The data signal OD2 output from the data driving circuit 300 to the data output line OL2 may be sequentially provided to the third color pixels G12, G14, G22, G24, G32, G34, G42, and G44.

When the blue pattern image is displayed on the display panel 100-1, the data driving circuit 300 may output the data signal OD3 corresponding to the maximum grayscale level of a blue color to the data output line OL3. The data signal OD3 output from the data driving circuit 300 to the data output line OL3 may be sequentially provided to the second color pixels B13, B17, B25, B33, B37, and B45.

When the blue pattern image is displayed on the display panel 100-1, the data driving circuit 300 may output the data signal OD4 corresponding to a minimum grayscale level of a green color to the data output line OL4. The data signal OD4 output from the data driving circuit 300 to the data output line OL4 may be sequentially provided to the third color pixels G16, G18, G26, G28, G36, G38, G46, and G48.

As shown in FIG. 5C, when the blue pattern image is displayed on the display panel 100-1, the data driving circuit 300 may continuously output a data signal corresponding to the minimum grayscale level of a red color to the data output line OL1, may continuously output data signals corresponding to the minimum grayscale level of a green color to data output lines OL2 and OL4, and may continuously output a data signal corresponding to the maximum grayscale level of a blue color to the data output line OL3. Accordingly, when the blue pattern image is displayed on the display panel 100-1, the data signals output to data output lines OL1, OL2, OL3, and OL4 may be maintained at a substantially constant voltage level. As a result, power consumption of the display device DD may be reduced or minimized.

Figure 6:
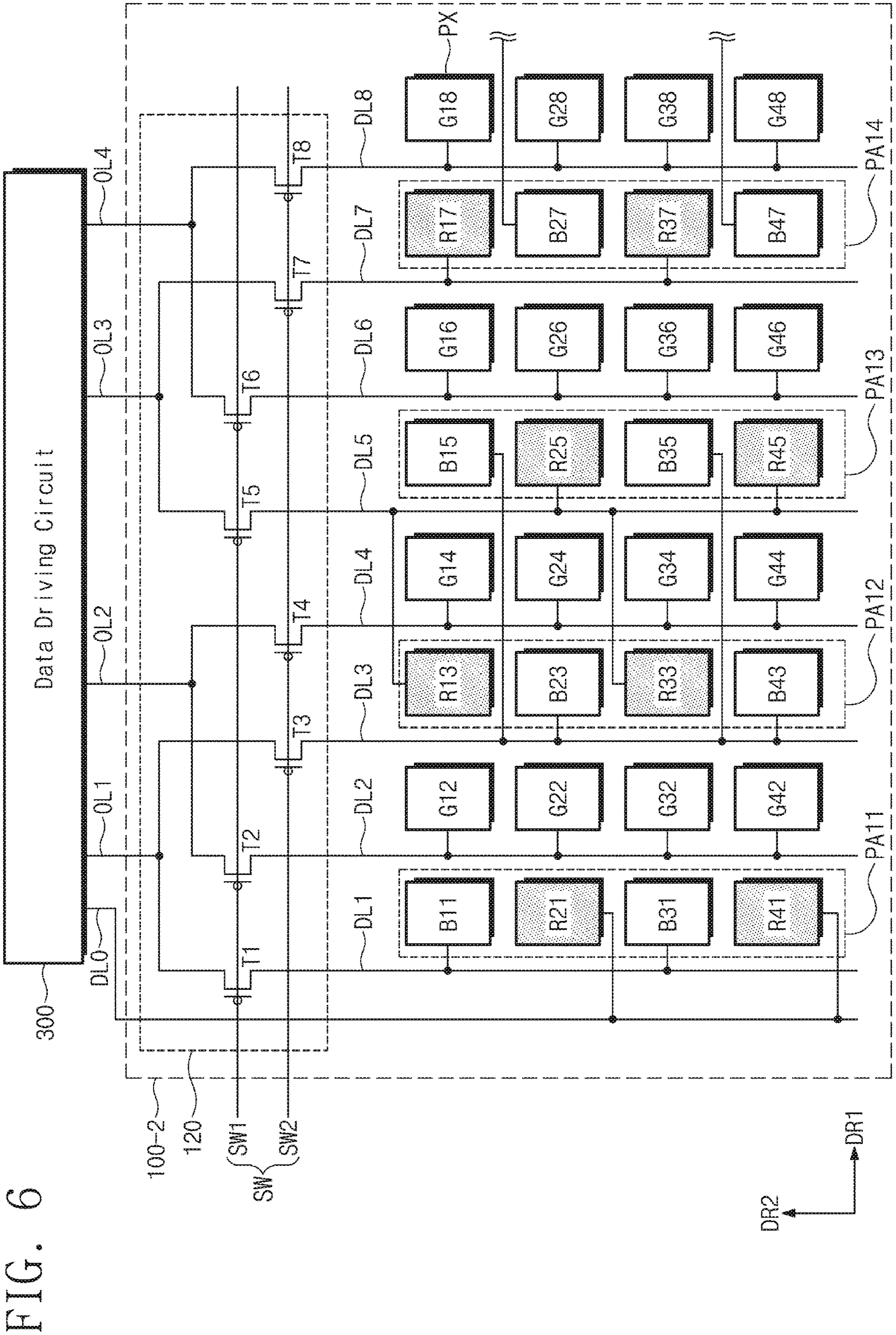
FIG. 6 illustrates an embodiment of pixels and a demultiplexer of a display panel.

FIG. 6 is a diagram illustrating pixels and a demultiplexer of a display panel 100-2 according to an embodiment.

Referring to FIG. 6, the display panel 100-2 includes first to fourth pixel arrays PA11, PA12, PA13, and PA14, the third color pixels (G), the demultiplexer 120, and the data lines DL0 to DL8. Only the nine data lines DL0 to DL8 are illustrated in FIG. 6, but the present disclosure is not limited thereto. The display panel 100-2 shown in FIG. 6 may have a configuration similar to that of the display panel 100-1 shown in FIG. 4 and may operate in substantially the same manner, and thus an additional description will be omitted to avoid redundancy.

Each of the first to fourth pixel arrays PA11, PA12, PA13, and PA14 may include the first color pixels (R) and the second color pixels (B). Each of the first pixel array PA11 and the third pixel array PA13 includes the second color pixels (B) and the first color pixels (R) alternately arranged one by one in a direction opposite to the second direction DR2. Each of the second pixel array PA12 and the fourth pixel array PA14 includes the first color pixels (R) and the second color pixels (B) alternately arranged one by one in a direction opposite to the second direction DR2.

In the example shown in FIG. 6, the first color pixels (R) include the first color pixels (R13, R17, R21, R25, R33, R37, R41, R45). The second color pixels (B) include second color pixels (B11, B15, B23, B27, B31, B35, B43, B47). The third color pixels (G) include third color pixels (G12, G14, G16, G18, G22, G24, G26, G28, G32, G34, G36, G38, G42, G44, G46, G48).

The second color pixels B11 and B31 in the first pixel array PA11 are connected to the data line DL1. The first color pixels R21 and R41 in the first pixel array PA11 are connected to the data line DL0.

The second color pixels B23 and B43 in the second pixel array PA12 are connected to the data line DL3. The first color pixels R13 and R33 in the second pixel array PA12 are connected to the data line DL5.

The second color pixels B15 and B35 in the third pixel array PA13 are connected to the data line DL3. The first color pixels R25 and R45 in the third pixel array PA13 are connected to the data line DL5.

In one embodiment, the second color pixels B27 and B47 in the fourth pixel array PA14 may be connected to a data line arranged on the right side of the data line DL8. The first color pixels R17 and R37 in the fourth pixel array PA14 are connected to the data line DL7.

The data driving circuit 300 sequentially outputs data signals to be provided to the second color pixel B11 and the second color pixel B15 to the data output line OL1.

The data driving circuit 300 sequentially outputs data signals to be provided to the third color pixel G12 and the third color pixel G14 to the data output line OL2.

The data driving circuit 300 sequentially outputs data signals to be provided to the first color pixel R13 and the first color pixel R17 to the data output line OL3.

The data driving circuit 300 sequentially outputs data signals to be provided to the third color pixel G16 and the third color pixel G18 to the data output line OL4.

As shown in FIGS. 4 and 6, even when locations of the first color pixels (R) and second color pixels (B) are exchanged, each of the data output lines OL1, OL2, OL3, and OL4 may output data signals to be provided to a like (e.g., the same color) pixel. Thus, the power consumption of the display device may be reduced or minimized.

Figure 7:
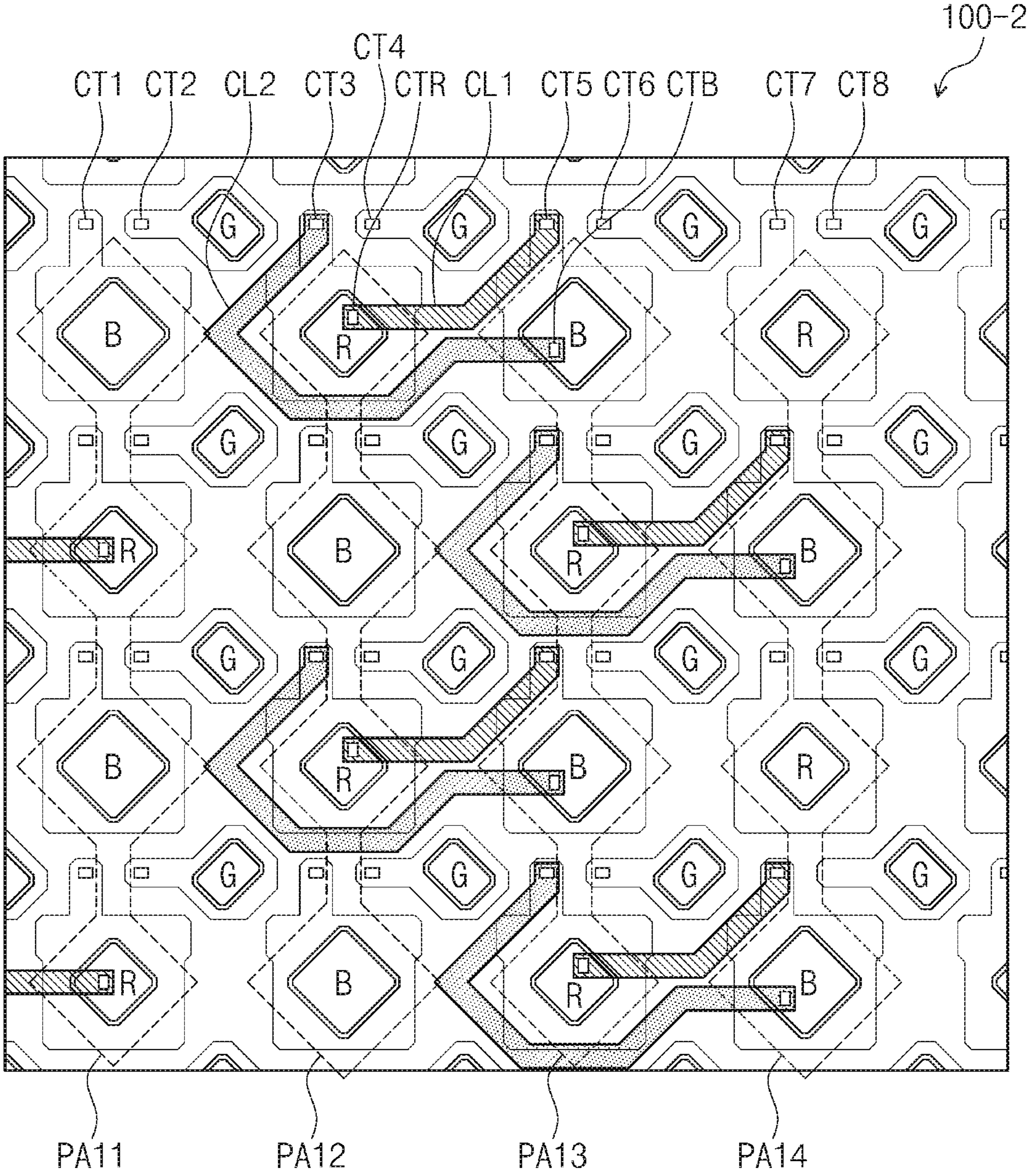
FIG. 7 illustrates an embodiment of a display panel.

FIG. 7 is a plan view of the display panel 100-2 shown in FIG. 6 according to an embodiment. Referring to FIG. 7, the display panel 100-2 includes the first color pixels (R), the second color pixels (B), the third color pixels (G), contacts CT1 to CT8, and connection wires CL1 and CL2. The contacts CT1 to CT8 correspond to the data lines DL1 to DL8 shown in FIG. 6, respectively. The first color pixels (R), the second color pixels (B), and the third color pixels (G) may be electrically connected to corresponding data lines among the data lines DL1 to DL8 through the contacts CT1 to CT8.

The first color pixel (R) in the second pixel array PA12 includes a pixel contact CTR. The connection wire CL1 connects the pixel contact CTR to the contact CT5. Accordingly, the first color pixel (R) in the second pixel array PA12 may be electrically connected to the data line DL5 illustrated in FIG. 6 through the pixel contact CTR, the connection wire CL1, and the contact CT5.

The second color pixel (B) in the third pixel array PA13 includes a pixel contact CTB. The connection wire CL2 connects the pixel contact CTB to the contact CT3. Accordingly, the second color pixel (B) in the third pixel array PA13 may be electrically connected to the data line DL3 shown in FIG. 6 through the pixel contact CTB, the connection wire CL2, and the contact CT3.

Figure 8:
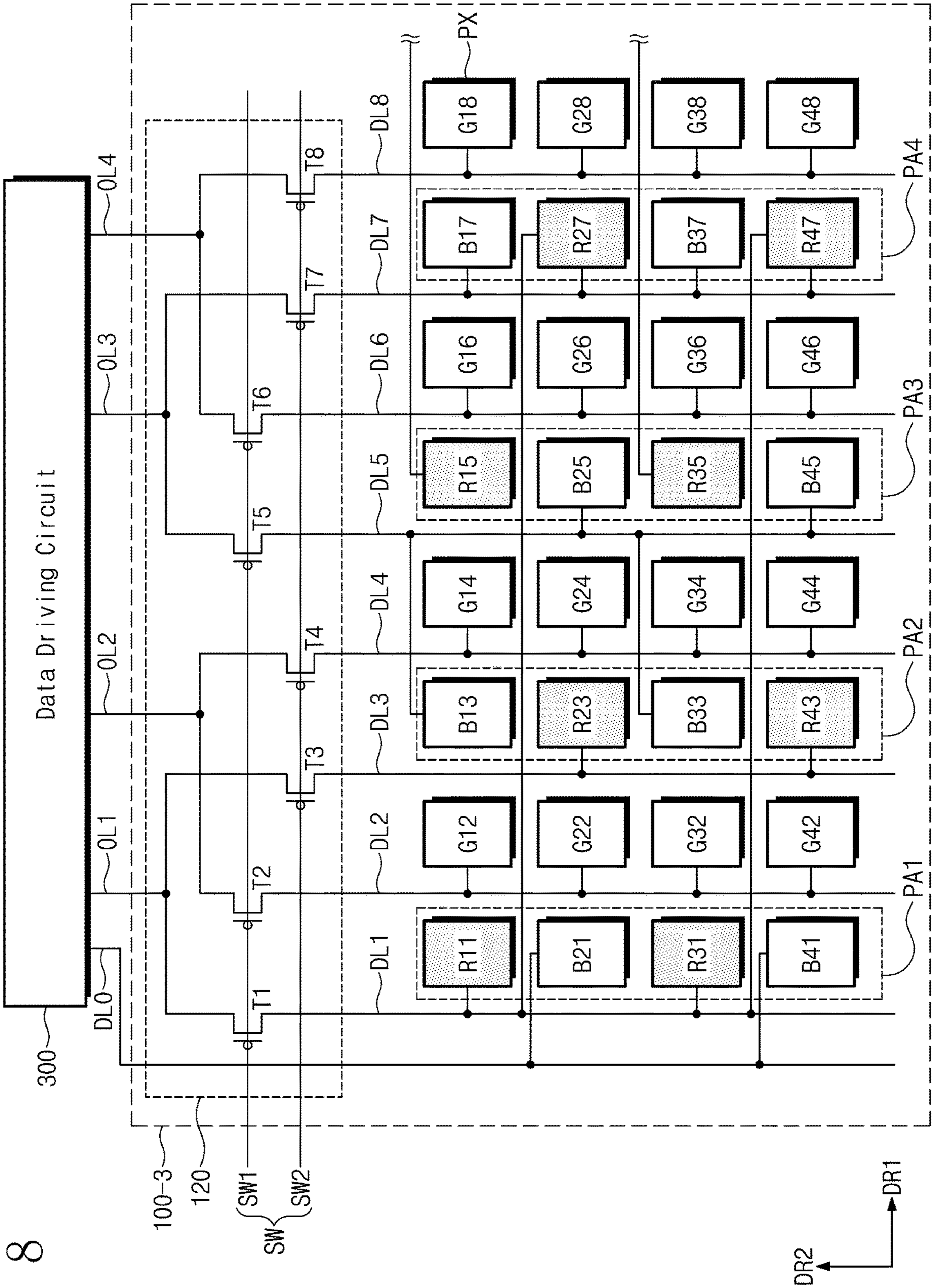
FIG. 8 illustrates an embodiment of pixels and a demultiplexer of a display panel.

FIG. 8 is a diagram illustrating pixels and a demultiplexer of a display panel 100-3 according to an embodiment.

Referring to FIG. 8, a display panel 100-3 includes the first to fourth pixel arrays PA1, PA2, PA3, and PA4, the third color pixels (G), the demultiplexer 120, and the data lines DL0 to DL8. Only the nine data lines DL0 to DL8 are illustrated in FIG. 8, but the present disclosure is not limited thereto. The display panel 100-3 shown in FIG. 8 may have a configuration similar to that of the display panel 100-1 shown in FIG. 4 and may operate in the similar manner, and thus an additional description will be omitted to avoid redundancy.

Each of the first to fourth pixel arrays PA1, PA2, PA3, and PA4 may include the first color pixels (R) and the second color pixels (B). Each of the first pixel array PA1 and the third pixel array PA3 includes the first color pixels (R) and the second color pixels (B) alternately arranged one by one in a direction opposite to the second direction DR2. Each of the second pixel array PA2 and the fourth pixel array PA4 includes the second color pixels (B) and the first color pixels (R) alternately arranged one by one in a direction opposite to the second direction DR2.

In the example shown in FIG. 8, the first color pixels (R) include the first color pixels (R11, R15, R23, R27, R31, R35, R43, R47). The second color pixels (B) include second color pixels (B13, B17, B21, B25, B33, B37, B41, B45). The third color pixels (G) include third color pixels (G12, G14, G16, G18, G22, G24, G26, G28, G32, G34, G36, G38, G42, G44, G46, G48).

The first color pixels R11 and R31 in the first pixel array PA1 are connected to the data line DL1. The second color pixels B21 and B41 in the first pixel array PA1 are connected to the data line DL0.

The first color pixels R23 and R43 in the second pixel array PA2 are connected to the data line DL3. The second color pixels B13 and B33 in the second pixel array PA2 are connected to the data line DL5.

In one embodiment, the first color pixels R15 and R35 in the fourth pixel array PA3 may be connected to a data line arranged on the right side of the data line DL8. The second color pixels B25 and B45 in the third pixel array PA3 are connected to the data line DL5. The first color pixels R27 and R47 in the fourth pixel array PA4 may be connected to the data line DL1. The second color pixels B17 and B37 in the fourth pixel array PA4 are connected to the data line DL7. Thus, only the first color pixels (R) are connected to the data lines DL1 and DL3, only the second color pixels (B) are connected to data lines DL5 and DL7, and only the third color pixels (G) are connected to data lines DL2, DL4, DL6, and DL8.

Accordingly, the data driving circuit 300 sequentially outputs data signals, which are to be provided to the first color pixel R11, R27, R23, R31, R47, and R43 to the data output line OL1.

The data driving circuit 300 sequentially outputs data signals, which are to be provided to the third color pixel G12, G14, G22, G24, G32, G34, G42, and G44 to the data output line OL2.

The data driving circuit 300 sequentially outputs data signals, which are to be provided to the second color pixel B13, B17, B25, B33, B37, and B45 to the data output line OL3.

The data driving circuit 300 sequentially outputs data signals, which are to be provided to the third color pixel G16, G18, G26, G28, G36, G38, G46, and G48 to the data output line OL4.

Figure 9:
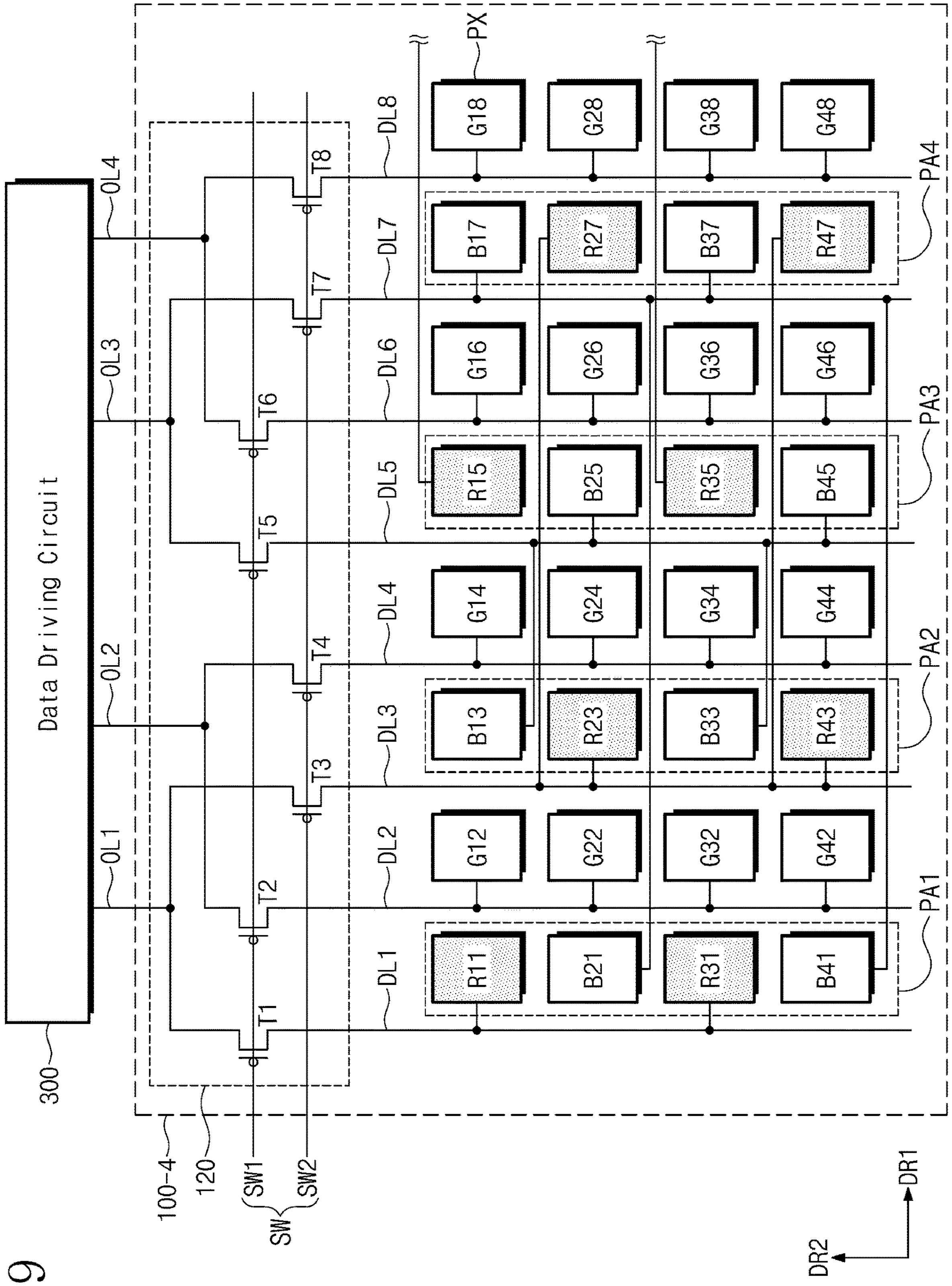
FIG. 9 illustrates an embodiment of pixels and a demultiplexer of a display panel.

FIG. 9 is a diagram illustrating pixels and a demultiplexer of a display panel 100-4 according to an embodiment.

Referring to FIG. 9, a display panel 100-4 includes the first to fourth pixel arrays PA1, PA2, PA3, and PA4, the third color pixels (G), the demultiplexer 120, and the data lines DL1 to DL8. Only the eight data lines DL1 to DL8 are illustrated in FIG. 9, but the present disclosure is not limited thereto. The display panel 100-4 shown in FIG. 9 may have a configuration similar to that of the display panel 100-1 shown in FIG. 4 and may operate in the similar manner, and thus an additional description will be omitted to avoid redundancy.

Each of the first to fourth pixel arrays PA1, PA2, PA3, and PA4 may include the first color pixels (R) and the second color pixels (B). Each of the first pixel array PA1 and the third pixel array PA3 includes the first color pixels (R) and the second color pixels (B) alternately arranged one by one in a direction opposite to the second direction DR2. Each of the second pixel array PA2 and the fourth pixel array PA4 includes the second color pixels (B) and the first color pixels (R) alternately arranged one by one in a direction opposite to the second direction DR2.

In the example shown in FIG. 9, the first color pixels (R) include the first color pixels (R11, R15, R23, R27, R31, R35, R43, R47). The second color pixels (B) include second color pixels (B13, B17, B21, B25, B33, B37, B41, B45). The third color pixels (G) include third color pixels (G12, G14, G16, G18, G22, G24, G26, G28, G32, G34, G36, G38, G42, G44, G46, G48).

The first color pixels R11 and R31 in the first pixel array PA1 are connected to the data line DL1. The second color pixels B21 and B41 in the first pixel array PA1 are connected to the data line DL7. The first color pixels R23 and R43 in the second pixel array PA2 are connected to the data line DL3. In one embodiment, the second color pixels B13 and B33 in the second pixel array PA2 may be connected to a data line arranged on the right side of the data line DL8. The first color pixels R15 and R35 in the third pixel array PA3 are connected to the data line DL3. The second color pixels B25 and B45 in the third pixel array PA3 are connected to the data line DL5. In one embodiment, the first color pixels R27 and R47 in the fourth pixel array PA4 may be connected to a data line arranged on the right side of the data line DL8. The second color pixels B17 and B37 in the fourth pixel array PA4 are connected to the data line DL7.

The third color pixels G12, G22, G32, and G42 are connected to the data line DL2, the third color pixels G14, G24, G34, and G44 are connected to the data line DL4, the third color pixels G16, G26, G36, and G46 are connected to the data line DL6, and the third color pixels G18, G28, G38, and G48 are connected to the data line DL8.

This, only the first color pixels (R) are connected to the data lines DL1 and DL3, only the second color pixels (B) are connected to data lines DL5 and DL7, and only the third color pixels (G) are connected to data lines DL2, DL4, DL6, and DL8.

Accordingly, the data driving circuit 300 sequentially outputs data signals, which are to be provided to the first color pixel R11, R15, R23, R31, R35, and R43 to the data output line OL1.

The data driving circuit 300 sequentially outputs data signals, which are to be provided to the third color pixel G12, G14, G22, G24, G32, G34, G42, and G44 to the data output line OL2.

The data driving circuit 300 sequentially outputs data signals, which are to be provided to the second color pixel B17, B25, B21, B37, B45, and B41 to the data output line OL3.

The data driving circuit 300 sequentially outputs data signals, which are to be provided to the third color pixel G16, G18, G26, G28, G36, G38, G46, and G48 to the data output line OL4.

As illustrated in FIGS. 8 and 9, the connection method of the data lines DL1 to DL8 and the first color pixels (R) and the second color pixels (B) may be changed in various ways, such that, for example, the data driving circuit 300 outputs only data signals, which are to be provided as first color pixels (R), to the data output line OL1 and the data driving circuit 300 outputs only the data signals, which are to be provided to the second color pixels (B), to the data output line OL3.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device to execute the code or instructions for performing the method embodiments or operations of the apparatus embodiments herein.

The controllers, processors, devices, modules, units, multiplexers, demultiplexers, generators, logic, interfaces, decoders, drivers, and other signal generating and signal processing features of the embodiments disclosed herein may be implemented, for example, in non-transitory logic that may include hardware, software, or both. When implemented at least partially in hardware, the controllers, processors, devices, modules, units, multiplexers, demultiplexers, generators, logic, interfaces, decoders, drivers, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, modules, units, multiplexers, demultiplexers, generators, logic, interfaces, decoders, drivers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions to implement the operations of the method embodiments may transform the computer, processor, controller, or other signal processing device into a special-purpose processor for performing the methods described herein.

Although described above with reference to a preferred embodiment of the present disclosure, it will be understood by those skilled in the art that various modifications and changes can be made in the present disclosure without departing from the spirit and scope of the present disclosure as set forth in the claims below. Accordingly, the technical scope of the present disclosure should not be limited to the contents described in the detailed description of the specification but should be defined by the claims.

A display device having such a configuration includes a demultiplexer, and thus the number of data output lines of the data driving circuit may be less than the number of data lines. Furthermore, the first color pixels may be electrically connected to the first data output line of the data driving circuit, and the second color pixels may be electrically connected to the second data output line of the data driving circuit, by changing the connection of first color pixels and second color pixels to data lines.

The data driving circuit may output only the data signal of the first color to the first data output line and may output only the data signal of the second color to the second data output line. Accordingly, the power consumption of the display device may be reduced.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device, comprising:

first to fourth pixel arrays;

a data driver electrically connected to a first data output line and a second data output line; and a demultiplexer configured to electrically connect a first data line and a second data line to the first data output line and to electrically connect a third data line and a fourth data line to the second data output line, wherein:

the first to fourth pixel arrays are arranged adjacent to the first to fourth data lines, respectively, each of the first to fourth pixel arrays includes first color pixels and second color pixels, the first color pixels in the second pixel array are connected to the second data line and the second color pixels in the second pixel array are connected to the third data line, and the second color pixels in the third pixel array are connected to the third data line and the first color pixels in the third pixel array are connected to the second data line.

2. The display device of claim 1, wherein:

the first to fourth pixel arrays are arranged spaced from one another in a first direction, and in each of the first to fourth pixel arrays, the first color pixels and the second color pixels are alternately arranged one-by-one in a second direction crossing the first direction.

3. The display device of claim 1, wherein the data driver is configured to:

output a data signal of a first color, which is to be provided to the first color pixels, to the first data output line, and output a data signal of a second color, which is to be provided to the second color pixels, to the second data output line.

4. The display device of claim 1, wherein:

the data driver is electrically connected to a third data output line and a fourth data output line, and the demultiplexer is configured to electrically connect a fifth data line and a sixth data line to the third data output line, and to electrically connect a seventh data line and an eighth data line to the fourth data output line.

5. The display device of claim 4, further comprising:

third color pixels, wherein each of the third color pixels is connected to a corresponding data line among the fifth to eighth data lines.

6. The display device of claim 5, wherein the data driver is configured to output a data signal of a third color, which is to be provided to the third color pixels, to the third data output line and the fourth data output line.

7. The display device of claim 4, wherein:

the fifth data line is interposed between the first data line and the second data line, the sixth data line is interposed between the second data line and the third data line, the seventh data line is interposed between the third data line and the fourth data line, and the eighth data line is arranged adjacent to the fourth data line.

8. The display device of claim 1, wherein the demultiplexer includes:

a first switching transistor connected between the first data output line and the first data line;

a second switching transistor connected between the first data output line and the second data line;

a third switching transistor connected between the second data output line and the third data line; and a fourth switching transistor connected between the second data output line and the fourth data line, wherein the first switching transistor and the third switching transistor are configured to operate in response to a first switching signal, and the second switching transistor and the fourth switching transistor are configured to operate in response to a second switching signal.

9. The display device of claim 8, further comprising:

a driving controller configured to output the first switching signal and the second switching signal.

10. The display device of claim 1, wherein:

the first color pixels are red color pixels, and the second color pixels are blue color pixels.

11. The display device of claim 1, further comprising:

a fifth data line and a sixth data line electrically connected to the data driver, wherein:

the first color pixels in the first pixel array are connected to the first data line, and the second color pixels in the first pixel array are connected to the fifth data line, and the second color pixels in the fourth pixel array are connected to the fourth data line, and the first color pixels in the fourth pixel array are connected to the sixth data line.

12. A display device, comprising:

a display panel including first color pixels and second color pixels;

a data driver configured to electrically connect to a first data output line and a second data output line; and a demultiplexer configured to electrically connect a first data line and a second data line to the first data output line and to electrically connect a third data line and a fourth data line to the second data output line, wherein:

the first color pixels in a first column are connected to the first data line, the first color pixels in a third column connected to the second data line, and the first color pixels in a fifth column are connected to the second data line, the second color pixels in the third column are connected to the third data line and the second color pixels in the fifth column are connected to the third data line, and second color pixels in a seventh column are connected to the fourth data line, and the data driver is configured to output a data signal of a first color, which is to be provided to the first color pixels, to the first data output line and to output a data signal of a second color, which is to be provided to the second color pixels, to the second data output line.

13. The display device of claim 12, wherein the first color pixels and the second color pixels are alternately arranged in a first direction, and are alternately arranged in a second direction crossing the first direction.

14. The display device of claim 12, wherein:

the data driver is electrically connected to a third data output line and a fourth data output line, and the demultiplexer is configured to electrically connect a fifth data line and a sixth data line to the third data output line, and to electrically connect a seventh data line and an eighth data line to the fourth data output line.

15. The display device of claim 14, further comprising:

third color pixels, wherein each of the third color pixels is connected to a corresponding data line among the fifth to eighth data lines.

16. The display device of claim 15, wherein the data driver is configured to output a data signal of a third color, which is to be provided to the third color pixels, to the third data output line and the fourth data output line.

17. The display device of claim 15, wherein:

the first color pixels are red color pixels, the second color pixels are blue color pixels, and the third color pixels are green color pixels.

18. The display device of claim 12, wherein the demultiplexer is arranged on the display panel.

19. A display device, comprising:

a display panel including first color pixels and second color pixels;

a data driver configured to electrically connect to a first data output line and a second data output line; and a demultiplexer configured to electrically connect a first data line and a second data line to the first data output line and to electrically connect a third data line and a fourth data line to the second data output line, wherein:

the first color pixels are connected to a corresponding data line among the first data line and the second data line, the second color pixels are connected to a corresponding data line among the third data line and the fourth data lines, and the data driver is configured to output a data signal of a first color, which is to be provided to the first color pixels, to the first data output line and to output a data signal of a second color, which is to be provided to the second color pixels, to the second data output line, wherein the demultiplexer includes:

a first switching transistor connected between the first data output line and the first data line;

a second switching transistor connected between the first data output line and the second data line;

a third switching transistor connected between the second data output line and the third data line; and a fourth switching transistor connected between the second data output line and the fourth data line, wherein the first switching transistor and the third switching transistor are configured to operate in response to a first switching signal, and the second switching transistor and the fourth switching transistor are configured to operate in response to a second switching signal.

20. The display device of claim 19, further comprising:

a driving controller configured to output the first switching signal and the second switching signal.

* * * * *